(12) United States Patent
Di et al.

(10) Patent No.: US 12,470,653 B2
(45) Date of Patent: Nov. 11, 2025

(54) METHOD AND APPARATUS FOR PREVENTING ACCIDENTAL TOUCH

(71) Applicant: Honor Device Co., Ltd., Shenzhen (CN)

(72) Inventors: Haoxuan Di, Shenzhen (CN); Danhong Li, Shenzhen (CN); Xiaowu Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/041,933

(22) PCT Filed: Sep. 7, 2022

(86) PCT No.: PCT/CN2022/117611
§ 371 (c)(1),
(2) Date: Feb. 16, 2023

(87) PCT Pub. No.: WO2023/098208
PCT Pub. Date: Jun. 8, 2023

(65) Prior Publication Data
US 2024/0291918 A1    Aug. 29, 2024

(30) Foreign Application Priority Data

Dec. 1, 2021    (CN) .......................... 202111459980.8

(51) Int. Cl.
*H04M 1/72463*    (2021.01)
*G06F 1/16*    (2006.01)
(Continued)

(52) U.S. Cl.
CPC .... *H04M 1/724631* (2022.02); *G06F 1/1694* (2013.01); *G06F 3/0346* (2013.01); *G06F 3/0412* (2013.01); *H04M 1/72454* (2021.01)

(58) Field of Classification Search
CPC ....... H04M 1/724631; H04M 1/72454; H04M 1/72463; G06F 1/1694; G06F 3/0346;
(Continued)

(56) References Cited

U.S. PATENT DOCUMENTS 10,750,007 B2 * 8/2020 Li .......................... G06F 1/1684
2010/0304757 A1   12/2010 Yoshioka
(Continued)

FOREIGN PATENT DOCUMENTS

CN    102984375 A    3/2013
CN    106911863 A    6/2017
(Continued)

*Primary Examiner* — Christopher M Brandt
*Assistant Examiner* — Quai'von V. Mallisham
(74) *Attorney, Agent, or Firm* — Rimon PC

(57) ABSTRACT

Disclosed are a method and an apparatus for preventing an accidental touch, applied to the field of terminal technologies. The method includes: obtaining a quaternion of a terminal; determining, based on the quaternion of the terminal, first information and attitude angle information of the terminal; detecting motion information of the terminal; detecting ambient light information of the terminal; determining, based on the first information, the attitude angle information, the motion information, and the ambient light information, that the terminal is in a first mode; and entering, by the terminal, a screen-off state to reduce power consumption. In addition, the terminal can be prevented from being awakened accidentally in always on display and lock screen-on states, thereby effectively preventing an accidental touch.

19 Claims, 10 Drawing Sheets

(51) Int. Cl.
*G06F 3/0346* (2013.01)
*G06F 3/041* (2006.01)
*H04M 1/72454* (2021.01)

(58) Field of Classification Search
CPC .... G06F 3/0412; G06F 1/1626; G06F 1/1684; G06F 1/3262; G06F 1/3265; G06F 1/3215; G06F 1/3231; G06F 3/0416; Y02D 30/70
See application file for complete search history.

(56) References Cited

U.S. PATENT DOCUMENTS

| | | | |
|---|---|---|---|
| 2012/0318061 | A1 | 12/2012 | Liang |
| 2019/0132441 | A1* | 5/2019 | Li ................... H04M 1/724631 |
| 2019/0385570 | A1* | 12/2019 | Huberman ............ G06F 1/3262 |
| 2021/0181919 | A1 | 6/2021 | Agarwal et al. |

FOREIGN PATENT DOCUMENTS

| | | | |
|---|---|---|---|
| CN | 107786743 | A | 3/2018 |
| CN | 107831985 | A | 3/2018 |
| CN | 108391002 | A | 8/2018 |
| CN | 108696639 | A | 10/2018 |
| CN | 108900710 | A | 11/2018 |
| CN | 109375859 | A | 2/2019 |
| CN | 110753154 | A | 2/2020 |
| EP | 3477423 | A1 | 5/2019 |
| WO | 2018040891 | A1 | 3/2018 |
| WO | 2018105828 | A1 | 6/2018 |
| WO | 2020056778 | A1 | 3/2020 |
| WO | 2020155876 | A1 | 8/2020 |
| WO | 2021213263 | A1 | 10/2021 |

* cited by examiner

METHOD AND APPARATUS FOR PREVENTING ACCIDENTAL TOUCH

CROSS-REFERENCE TO RELATED APPLICATIONS

This application is a national stage of International Application No. PCT/CN2022/117611, filed on Sep. 7, 2022, which claims priority to Chinese Patent application Ser. No. 202111459980.8, filed on Dec. 1, 2021. The disclosures of both of the aforementioned applications are hereby incorporated by reference in their entireties.

TECHNICAL FIELD

This application relates to the field of terminal technologies, and in particular, to a method and an apparatus for preventing an accidental touch.

BACKGROUND

When a user places a touchscreen terminal in a backpack or a pocket, if the touchscreen terminal touches a capacitive substance when a screen is on, an accidental touch usually occurs. In this scenario, the following problems may occur: Power consumption is high when the screen is on for a long time, a fingerprint unlock function may be locked after a fingerprint is incorrectly entered for many times due to accidental touches, a password input function may be locked after a password is incorrectly entered for many times due to accidental touches, and an emergency call due to an accidental touch trigger a false alarm. These problems seriously affect user experience. Therefore, there is an urgent need to provide a method for preventing an accidental touch.

SUMMARY

In view of this, this application provides a method and an apparatus for preventing an accidental touch, a computer-readable storage medium, and a computer program product, so as to effectively resolve a problem of an accidental touch in a pocket mode, and greatly improve user experience.

According to a first aspect, a method for preventing an accidental touch is provided, including:
  obtaining a quaternion of a terminal by using an acceleration sensor and a gyro sensor, where the quaternion is used to represent an attitude of the terminal;
  determining first information and attitude angle information of the terminal based on the quaternion of the terminal, where the first information is used to identify whether the terminal is in a head-down state, and the attitude angle information is used to identify an attitude of the terminal;
  detecting motion information of the terminal by using the acceleration sensor, where the motion information is used to identify a motion status of the terminal;
  detecting ambient light information of the terminal by using an ambient light sensor, where the ambient light information is used to identify light intensity of an environment in which the terminal is located;
  determining, based on the first information, the attitude angle information, the motion information, and the ambient light information, that the terminal is in a first mode, where the first mode is used to identify that status information of the terminal meets a corresponding preset condition of the terminal; and entering, by the terminal, a screen-off state.

Optionally, that the terminal is in a head-down pocket mode includes the following conditions: the first information meets a first preset condition, the attitude angle information meets a second preset condition, the motion information meets a third preset condition, and the ambient light information meets a fourth preset condition.

The foregoing method may be performed by a terminal device or a chip in a terminal device. Based on the foregoing solution, information of the terminal (including but not limited to the ambient light information, the first information, the attitude angle information, and the motion information) is cooperatively detected by using a plurality of sensors, and whether the terminal is in the first mode is determined based on the information of the terminal. If it is determined that the terminal is in a head-down pocket mode, the terminal enters a screen-off state in the pocket mode to reduce power consumption, and the terminal can further be prevented from being awakened accidentally in always on display and lock screen-on states, thereby effectively preventing an accidental touch.

In a possible implementation, the determining, based on the first information, that the terminal is in a first mode includes: the first information meets the first preset condition.

That the first information meets the first preset condition includes: a product of a first gravity component and a second gravity component of the terminal is a negative number; and an absolute value of the first gravity component is greater than a first threshold, and an absolute value of the second gravity component is less than the first threshold. The first gravity component and the second gravity component are obtained through calculation based on the quaternion.

In a possible implementation, the determining, based on the attitude angle information, that the terminal is in a first mode includes: the attitude angle information meets the second preset condition. That the attitude angle information meets the second preset condition includes: a pitch angle of the terminal is within a preset angle range. The pitch angle of the terminal is obtained through calculation based on the quaternion.

In a possible implementation, the determining, based on the motion information, that the terminal is in a first mode includes: the motion information meets the third preset condition. That the motion information meets the third preset condition includes: an accelerometer combined speed value for n consecutive frames is less than or equal to a combined speed threshold, that is, n≥2, where n is an integer.

In a possible implementation, that the motion information meets the third preset condition further includes: a difference between an accelerometer combined speed value of the $i^{th}$ frame and an accelerometer combined speed value of the $(i-1)^{th}$ frame in the n consecutive frames is less than a predetermined difference threshold, that is, i∈[2,n]. Therefore, a motion status of the terminal is determined by using the accelerometer combined speed value for n consecutive frames, which can avoid misjudgment of the motion status of the terminal when a large shake occurs in the pocket mode, and ensure accuracy of a determining result.

In a possible implementation, the determining, based on the ambient light information, that the terminal is in a first mode includes: the ambient light information meets the fourth preset condition. That the ambient light information meets the fourth preset condition includes: ambient light illuminance of the terminal is less than or equal to a first light threshold.

In a possible implementation, when the ambient light illuminance of the terminal is greater than the first light threshold, the method further includes:
  detecting, by using the ambient light sensor, whether ambient light of the terminal is greater than a second light threshold, where the second light threshold is greater than the first light threshold; and
  when the ambient light illuminance of the terminal is greater than the second light threshold, a screen of the terminal is on; and
  when the ambient light illuminance of the terminal is less than or equal to the second light threshold, the terminal enters a screen-off state.

Therefore, by further detecting the ambient light of the terminal, a relationship between the ambient light illuminance and the second light threshold is compared, so as to determine whether to turn off or turn on the screen, thereby avoiding unnecessary power consumption, which further reduces power consumption.

In this embodiment of this application, regardless of whether an optical proximity sensor is disposed in the terminal, the foregoing method for preventing an accidental touch is applicable.

In a possible implementation, an optical proximity sensor is disposed in the terminal. Before the determining, based on the first information, the attitude angle information, the motion information, and the ambient light information, that the terminal is in a first mode, the method further includes: detecting reflected light information of the terminal by using the optical proximity sensor; and when no reflected light is detected, determining, based on the head-down information, the attitude angle information, the motion information, and the ambient light information, whether the terminal is in a head-down pocket mode.

Therefore, when the proximity light sensor determines that it is not close, the proximity light sensor may further determine with reference to the foregoing first information, the attitude angle information, the motion information, and the ambient light information, so as to determine whether the terminal is in the head-down pocket mode, to obtain a more accurate determining result.

In a possible implementation, before the terminal enters a screen-off state, the method further includes: detecting an interface of the terminal; and if the interface of the terminal is an always on display AOD interface, AOD is off; or if the interface of the terminal is a lock screen interface, the terminal enters an accidental touch prevention mode. Therefore, before the screen-off state is entered, power consumption can be further reduced by detecting an interface of the terminal and performing corresponding processing based on an actual state of the interface.

According to a second aspect, an apparatus for preventing an accidental touch is provided, including a unit configured to perform any one of the methods in the first aspect. The apparatus may be a terminal (or a terminal device), or may be a chip in a terminal (or a terminal device). The apparatus includes an input unit, a display unit, and a processing unit.

When the apparatus is a terminal, the processing unit may be a processor, the input unit may be a communication interface, and the display unit may be a graphics processing module and a screen. The terminal may further include a memory, where the memory is configured to store computer program code, and when the processor executes the computer program code stored in the memory, the terminal is enabled to perform any method in the first aspect.

When the apparatus is a chip in a terminal, the processing unit may be a logical processing unit in the chip, the input unit may be an output interface, a pin, a circuit, or the like, and the display unit may be a graphics processing unit in the chip. The chip may further include a memory, where the memory may be a memory (for example, a register or a cache) in the chip, or may be a memory (for example, a read-only memory or a random access memory) located outside the chip. The memory is configured to store computer program code, and when the processor executes the computer program code stored in the memory, the chip is enabled to perform any method in the first aspect.

In an implementation, the processing unit is configured to obtain a quaternion of a terminal by using an acceleration sensor and a gyro sensor, where the quaternion is used to represent an attitude of the terminal; determine, based on the quaternion of the terminal, first information and attitude angle information of the terminal, where the first information is used to identify whether the terminal is in a head-down state, and the attitude angle information is used to identify an attitude of the terminal; detect motion information of the terminal by using the acceleration sensor, where the motion information is used to identify a motion status of the terminal; detect ambient light information of the terminal by using an ambient light sensor, where the ambient light information is used to identify light intensity of an environment in which the terminal is located; and determine, based on the first information, the attitude angle information, the motion information, and the ambient light information, that the terminal is in a first mode, where the first mode is used to identify that status information of the terminal meets a corresponding preset condition of the terminal; and the display unit enters a screen-off state.

In an implementation, that the processing unit is configured to determine, based on the first information, that the terminal is in a first mode includes: the first information meets a first preset condition. That the first information meets a first preset condition includes: a product of a first gravity component and a second gravity component of the terminal is a negative number; and an absolute value of the first gravity component is greater than a first threshold, and an absolute value of the second gravity component is less than the first threshold; and
  the first gravity component and the second gravity component are obtained through calculation based on the quaternion.

In an implementation, that the processing unit is configured to determine, based on the attitude angle information, that the terminal is in a first mode includes: the attitude angle information meets a second preset condition; and that the attitude angle information meets a second preset condition includes: a pitch angle of the terminal is within a preset angle range; and
  the pitch angle of the terminal is obtained through calculation based on the quaternion.

In an implementation, that the processing unit is configured to determine, based on the motion information, that the terminal is in a first mode includes: the motion information meets a third preset condition. That the motion information meets a third preset condition includes: an accelerometer combined speed value of n consecutive frames is less than or equal to a combined speed threshold, that is, n≥2, where n is an integer.

In an implementation, that the motion information meets a third preset condition further includes: a difference between an accelerometer combined speed value of the $i^{th}$ frame and an accelerometer combined speed value of the $(i-1)^{th}$ frame in the n consecutive frames is less than a predetermined difference threshold, that is, i=[2,n].

In an implementation, that the processing unit is configured to determine, based on the ambient light information, that the terminal is in a first mode includes: the ambient light information meets a fourth preset condition. That the ambient light information meets a fourth preset condition includes: ambient light illuminance of the terminal is less than or equal to a first light threshold.

In an implementation, the processing unit is further configured to: when the ambient light illuminance of the terminal is greater than the first light threshold, detect, by using the ambient light sensor, whether ambient light of the terminal is greater than a second light threshold, where the second light threshold is greater than the first light threshold; and when the ambient light illuminance of the terminal is greater than the second light threshold, a screen of the terminal is on; and when the ambient light illuminance of the terminal is less than or equal to the second light threshold, the terminal enters a screen-off state.

In an implementation, the processing unit is further configured to detect reflected light information of the terminal by using an optical proximity sensor; and when no reflected light is detected, determine, based on the first information, the attitude angle information, the motion information, and the ambient light information, that the terminal is in the first mode.

In an implementation, before the terminal enters an off-screen state, the processing unit is further configured to detect an interface of the terminal; and if the interface of the terminal is an always on display AOD interface, the AOD of the display unit is off; or if the interface of the terminal is a lock screen interface, the terminal enters an accidental touch prevention mode.

According to a third aspect, a computer-readable storage medium is provided. The computer-readable storage medium stores computer program code, and when the computer program code is run by an apparatus for preventing an accidental touch, the apparatus is enabled to perform any method in the first aspect.

According to a fourth aspect, a computer program product is provided, where the computer program product includes computer program code, and when the computer program code is run by an apparatus for preventing an accidental touch, the apparatus is enabled to perform any method in the first aspect.

DESCRIPTION OF EMBODIMENTS

The following describes technical solutions in embodiments of this application with reference to accompanying drawings.

The method for preventing an accidental touch provided in the embodiments of this application may be applied to a terminal with a touchscreen. The terminal may be, for example, a mobile phone, a tablet computer, a multimedia playback device, an e-book reader, a personal computer, a personal digital assistant (personal digital assistant, PDA), or a smartwatch. A specific form of the terminal is not limited in this application.

The technical solutions in the embodiments of this application are applied to a scenario in which the terminal is in a backpack or a clothing (such as clothes or pants) pocket. In actual application, a user can place the terminal in a clothing pocket, a pants pocket, or a backpack. For ease of description, a scenario in which the terminal is in a backpack or a clothing (such as clothes or pants) pocket may be referred to as a pocket mode.

It may be understood that a terminal in a pocket mode includes the following common attitudes: head-up vertical screen, head-down vertical screen, screen up, screen down, horizontal screen up (there may be a specific inclination angle), and the like. The head-down vertical screen is the most common state when a terminal is placed in a pocket in daily life.

It may be further understood that a behavior scenario of the user is not limited in this application. For example, the behavior scenario of the user includes but is not limited to the following behaviors: walking, running, sitting, standing, lying, jumping, or riding.

Figure 1:
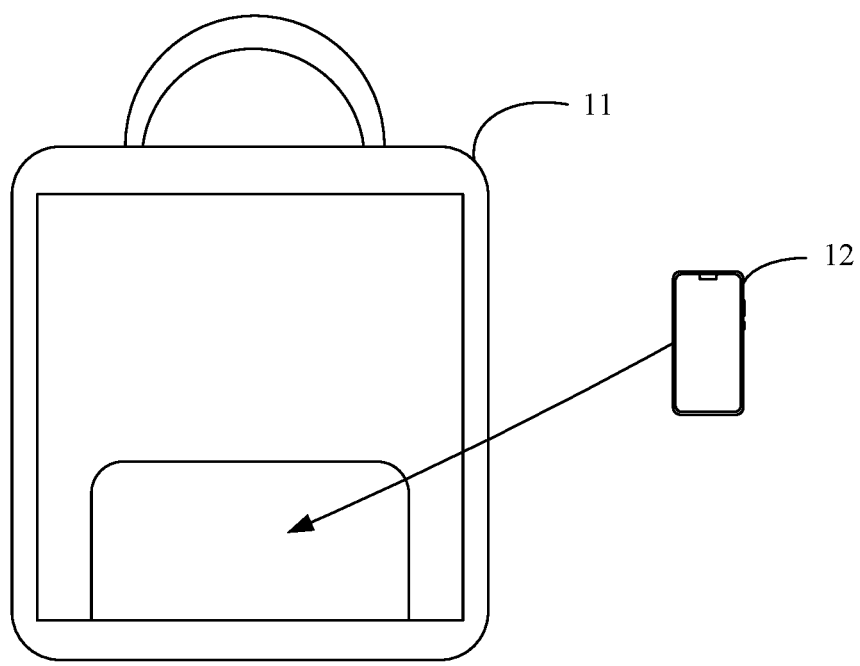
FIG. 1 is a diagram showing an example of an application scenario according to an embodiment of this application.

FIG. 1 is a diagram showing an example of an application scenario according to an embodiment of this application. As shown in FIG. 1, in this application scenario, a terminal 12 is placed in a backpack 11. When the terminal 12 is placed in the backpack 11, the user does not need to use the terminal 12. When the terminal 12 is in the backpack 11, the terminal 12 may be in contact with the backpack 11 or a capacitive substance (a metal conductive substance, skin, and the like) included in the backpack 11, and an accidental touch occurs.

It may be understood that the backpack 11 shown in FIG. 1 may alternatively be replaced with a clothing pocket. This is not specifically limited.

It should be understood that the scenario in FIG. 1 merely represents an application scenario of this application. This does not limit the embodiments of this application, and this application is not limited thereto.

When the terminal is in a pocket mode, an object in contact with the terminal may trigger the terminal to turn on a screen, and the terminal is awakened accidentally. Such screen-on is not expected by the user. If the terminal is in a screen-on state for a long time in the pocket mode, power consumption is seriously wasted. The object in contact with the terminal includes but is not limited to the following contents: a clothing pocket, a backpack, a clothing pocket, or a capacitive substance (a metal conductive material, skin, or the like) included in the backpack.

In addition, in the screen-on state (the screen-on state includes always on display (always on display, AOD) and lock screen-on states) of the terminal, the object in contact with the terminal may trigger the terminal for a plurality of times, and consequently, a plurality of accidental touches are triggered, which severely affects user experience (for example, a fingerprint unlock function may be locked after a fingerprint is incorrectly entered for many times due to accidental touches, a password input function may be locked after a password is incorrectly entered for many times due to accidental touches, and an emergency call due to an accidental touch trigger a false alarm).

AOD means that when a whole screen is not on, a part of the screen of the terminal is on and some important information is displayed on the terminal.

According to the technical solution provided in this embodiment of this application, information (including but not limited to ambient light information, first information, attitude angle information, and motion information) of the terminal is cooperatively detected by using a plurality of sensors, and whether the terminal is in a head-down pocket mode is determined based on the information of the terminal. If it is determined that the terminal is in a head-down pocket mode, the terminal enters a screen-off state in the pocket mode to reduce power consumption, and the terminal can further be prevented from being awakened accidentally in always on display and lock screen-on states, thereby effectively preventing an accidental touch.

Figure 2:
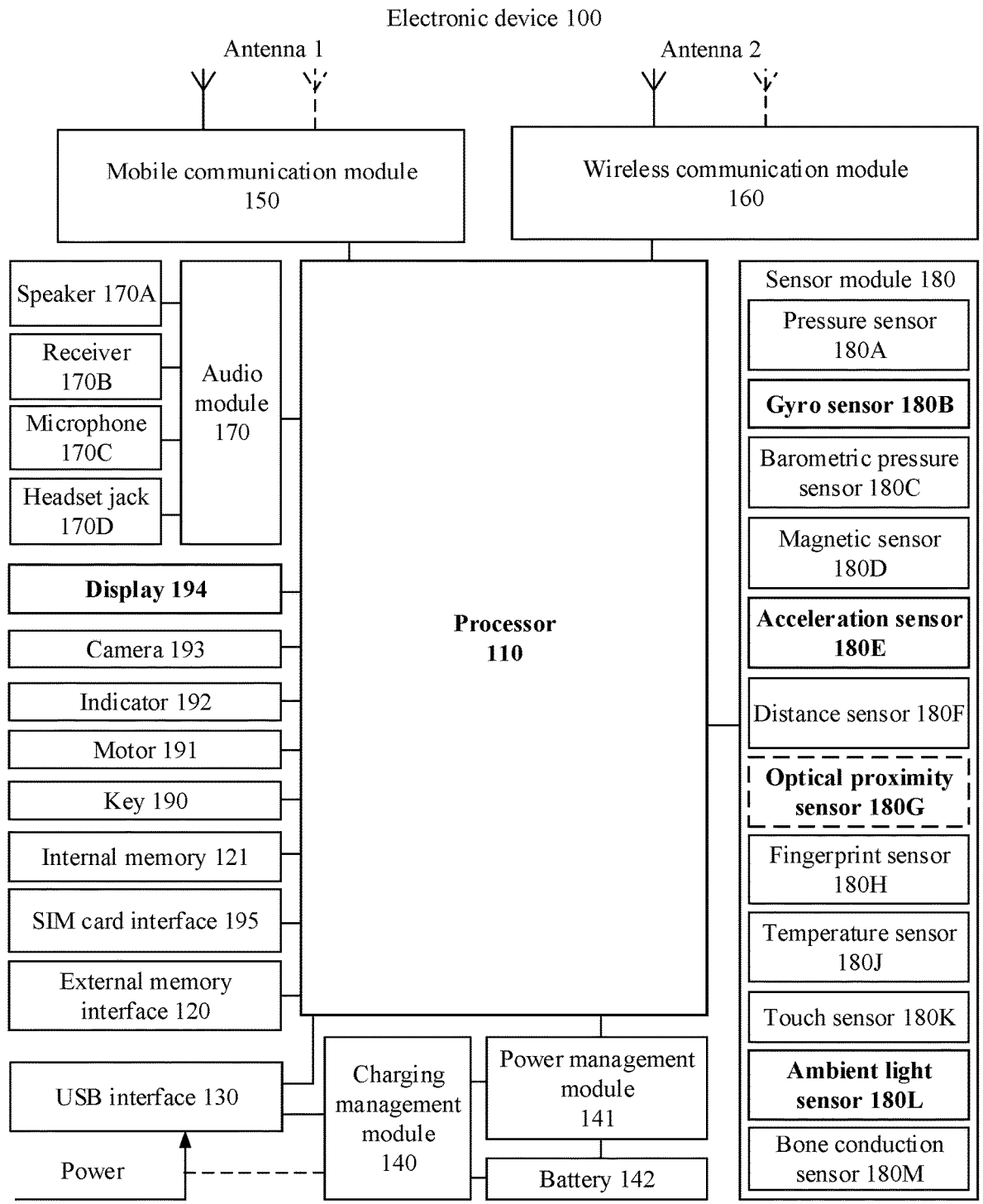
FIG. 2 is a schematic diagram of a hardware system applicable to an electronic device according to this application.

FIG. 2 shows a hardware system applicable to an electronic device according to this application.

The electronic device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, and a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 2 does not constitute a specific limitation on the electronic device 100. In some other embodiments of this application, the electronic device 100 may include more or fewer components than the components shown in FIG. 2, or the electronic device 100 may include a combination of some components in the components shown in FIG. 2, or the electronic device 100 may include subcomponents of some components in the components shown in FIG. 2. For example, the proximity optical sensor 180G shown in FIG. 2 may be optional. The components shown in FIG. 2 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices, or may be integrated devices.

The controller may generate an operation control signal based on an instruction operation code and a time sequence signal, to control instruction reading and instruction execution.

The processor 110 may further be provided with a memory for storing an instruction and data. In some embodiments, the memory in the processor 110 is a cache. The memory may store an instruction or data that has just been used or is cyclically used by the processor 110. If the processor 110 needs to use the instruction or the data again, the processor 110 may directly invoke the instruction or the data from the memory, Repeated access is avoided, and a waiting time of the processor 110 is reduced, thereby improving system efficiency.

The connection relationship between the modules shown in FIG. 2 is merely an example for description, and does not constitute a limitation on the connection relationship between the modules of the electronic device 100. Optionally, modules of the electronic device 100 may alternatively use a combination of a plurality of connection manners in the foregoing embodiment.

The electronic device 100 may implement a display function by using the GPU, the display 194, and the application processor. The GPU is a microprocessor for image processing, and is connected to the display 194 and the application processor. The GPU is configured to perform mathematical and geometric calculation and is configured to perform graphics rendering. The processor 110 may include one or more GPUs that execute program instructions to generate or change display information.

The display 194 may be configured to display an image or a video. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini light-emitting diode (mini light-emitting diode, Mini LED), a micro light-emitting diode (micro light-emitting diode, Micro LED), a Micro OLED (Micro OLED), or a quantum dot light emitting diodes (quantum dot light emitting diodes, QLED). In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera by using a lens, an optical signal is converted into an electrical signal, and the electrical signal is transmitted by the photosensitive element of the camera to the ISP for processing and converted into an image visible to a naked eye. The ISP may perform algorithm optimization on a noise, brightness, and a color of an image, and the ISP may further optimize parameters such as exposure and a color temperature of a photographing scene. In some embodiments, the ISP may be disposed on the camera 193.

The camera 193 is configured to capture a still image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert into a digital image signal. The ISP outputs the digital image signal to the DSP for processing. The DSP converts the digital image signal into a standard image signal in a format such as red green blue (red green blue, RGB) or YUV. In some embodiments, the electronic device 100 may include one or N cameras 193, where N is a positive integer greater than 1.

The digital signal processor is configured to process a digital signal. In addition to processing the digital image signal, the digital signal processor may also process another digital signal. For example, when the electronic device 100 selects a frequency, the digital signal processor is configured to perform Fourier transform or the like on energy of the frequency.

The electronic device 100 may implement audio functions, such as music playback and recording, by using the audio module 170, the speaker 170A, the receiver 170B, the microphone 170C, the headset jack 170D, and the application processor.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 or some functional modules of the audio module 170 may be disposed on the processor 110.

The speaker 170A, also referred to as a loudspeaker, is configured to convert an audio electrical signal into a sound signal. The electronic device 100 may be used to listen to music or a hands-free call through the speaker 170A.

The receiver 170B, also referred to as an earpiece, is configured to convert an audio electrical signal into a sound signal. When a user uses the electronic device 100 to answer a phone call or a voice message, the receiver 170B may be placed near the user's ear to answer the voice.

The microphone 170C, also referred to as a mike or a mic, is configured to convert a sound signal into an electrical signal. When making a call or sending a voice message, the user may make a sound near the microphone 170C, to input a sound signal to the microphone 170C.

The headset jack 170D is configured to connect to a wired headset. The headset jack 170D may be the USB interface 130, or may be a 3.5 mm open mobile terminal 100 platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, or a capacitive pressure sensor. The capacitive pressure sensor may include at least two parallel plates with conductive materials. When a force acts on the pressure sensor 180A, a capacitance between the electrodes changes, and the electronic device 100 determines pressure strength based on a capacitance change. When a touch operation is performed on the display 194, the electronic device 100 detects the touch operation based on the pressure sensor 180A. The electronic device 100 may also calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS application icon, an instruction for viewing an SMS message is executed; or when a touch operation whose touch operation strength is greater than or equal to the first pressure threshold is performed on the SMS application icon, an instruction for creating a new SMS message is executed.

The gyro sensor 180B may be configured to determine a motion attitude of the electronic device 100. In some embodiments, angular velocities of the electronic device 100 around three axes (that is, x axis, y axis, and z axis) may be determined by using the gyro sensor 180B. The gyro sensor 180B may be configured to achieve anti-shake during photographing. For example, when a shutter is pressed, the gyro sensor 180B detects a shaking angle of the electronic device 100, calculates a distance that needs to be compensated by a lens module based on the shaking angle, and allows the lens to counteract the shaking of the electronic device 100 through reverse motion to achieve anti-shake. The gyro sensor 180B may be further configured to navigate and sense a game scenario.

The barometric pressure sensor 180C is configured to measure barometric pressure. In some embodiments, the electronic device 100 calculates an altitude, assists positioning and navigation based on a barometric pressure value measured by the barometric pressure sensor 180C.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of the flip by using the magnetic sensor 180D. The electronic device 100 may set, based on the detected opening or closing status of the cover or the flip, a feature such as automatic unlocking of the flip.

The acceleration sensor 180E may detect acceleration of the electronic device 100 in all directions (generally, the x-axis, the y-axis, and the z-axis). When the electronic device 100 is still, magnitude and a direction of gravity may be detected. The acceleration sensor 180E may be further configured to identify an attitude of the electronic device 100 as an input parameter of applications such as a horizontal and vertical screen switching and a pacemaker.

In some embodiments, a quaternion of the electronic device 100 may be obtained by using the acceleration sensor 180E and the gyro sensor 180B.

In some embodiments, motion information of the electronic device 100 may be detected by using the acceleration sensor 180E.

The distance sensor 180F is configured to measure a distance. The electronic device 100 may measure a distance by using infrared or a laser. In some embodiments, for example, in a photographing scenario, the electronic device 100 may use the distance sensor 180F to measure distance to implement fast focusing.

The optical proximity sensor 180G may include, for example, a light-emitting diode (light-emitting diode, LED) and an optical detector such as a photodiode. The LED may be an infrared LED. The electronic device 100 emits infrared light by using the LED. The electronic device 100 detects infrared reflected light from a nearby object by using the photodiode. When reflected light is detected, the electronic device 100 may determine that there is an object near the electronic device 100. When no reflected light is detected, the electronic device 100 may determine that there is no object near the electronic device 100. The electronic device 100 may detect whether the user held the electronic device 100 close to an ear to make a call by using the proximity optical sensor 180G, so as to automatically turn off a screen to save power. The optical proximity sensor 180G may also be used for automatic unlock and automatic lock in a sheath mode or the pocket mode. It should be understood that the proximity light sensor 180G in FIG. 2 may be an optional component. In some scenarios, an ultrasonic sensor may be used to replace the proximity light sensor 180G to detect proximity light.

The ambient light sensor 180L is configured to sense brightness of ambient light. The terminal device 100 can adaptively adjust brightness of the display 194 based on the sensed brightness of the ambient light. The ambient light sensor 180L may also be configured to automatically adjust a white balance when photographing. The ambient light sensor 180L may further cooperate with the optical proximity sensor 180G to detect whether the electronic device 100 is in the pocket to prevent an accidental touch. In some embodiments, ambient light information of the terminal may be detected by using the ambient light sensor 180L.

The fingerprint sensor 180H is configured to collect a fingerprint. The electronic device 100 may implement functions such as unlocking, accessing an application lock, photographing, and receiving a call by using features of the collected fingerprint.

The touch sensor 180K is also referred to as a touch device. The touch sensor 180K may be disposed on the display 194. The touch sensor 180K and the display 194 form a touchscreen, and the touchscreen is also referred to as a touch screen. The touch sensor 180K is configured to detect a touch operation performed on or near the touch sensor 180K. The touch sensor 180K may transfer the detected touch operation to the application processor to determine a touch event type. A visual output related to a touch operation may be provided by using the display 194. In some other embodiments, the touch sensor 180K may also be disposed on a surface of the electronic device 100, and is disposed at a position different from the display 194.

The key 190 includes a power-on key and a volume key. The key 190 may be a mechanical key, or may be a touch-sensitive key. The electronic device 100 may receive a key input signal, to implement a function related to the key input signal.

The motor 191 may generate a vibration. The motor 191 may be configured to provide an incoming call prompt, or may be configured to provide a touch feedback. The motor 191 may generate different vibration feedback effects for different touch operations performed on different applications. For touch operations performed on different areas of the display 194, the motor 191 may also generate different vibration feedback effects. Different application scenarios (for example, a time reminder, receiving messages, an alarm clock, and a game) may correspond to different vibration feedback effects. The touch vibration feedback effects may further support customization.

In some embodiments, the processor 110 may determine, based on a quaternion of the terminal, first information and attitude angle information of the terminal, where the first information is used to identify whether the terminal is in a head-down state, and the attitude angle information is used to identify an attitude of the terminal; and determine, based on the first information, the attitude angle information, the motion information, and the ambient light information, that the electronic device 100 is in a first mode.

The foregoing describes in detail a hardware system of the electronic device 100. The following describes a software system of the electronic device 100. A software system may use a layered architecture, an event-driven architecture, a microkernel architecture, a microservice architecture, or a cloud architecture. In this embodiment of this application, the layered architecture is used as an example to describe the software system of the electronic device 100.

Figure 3:
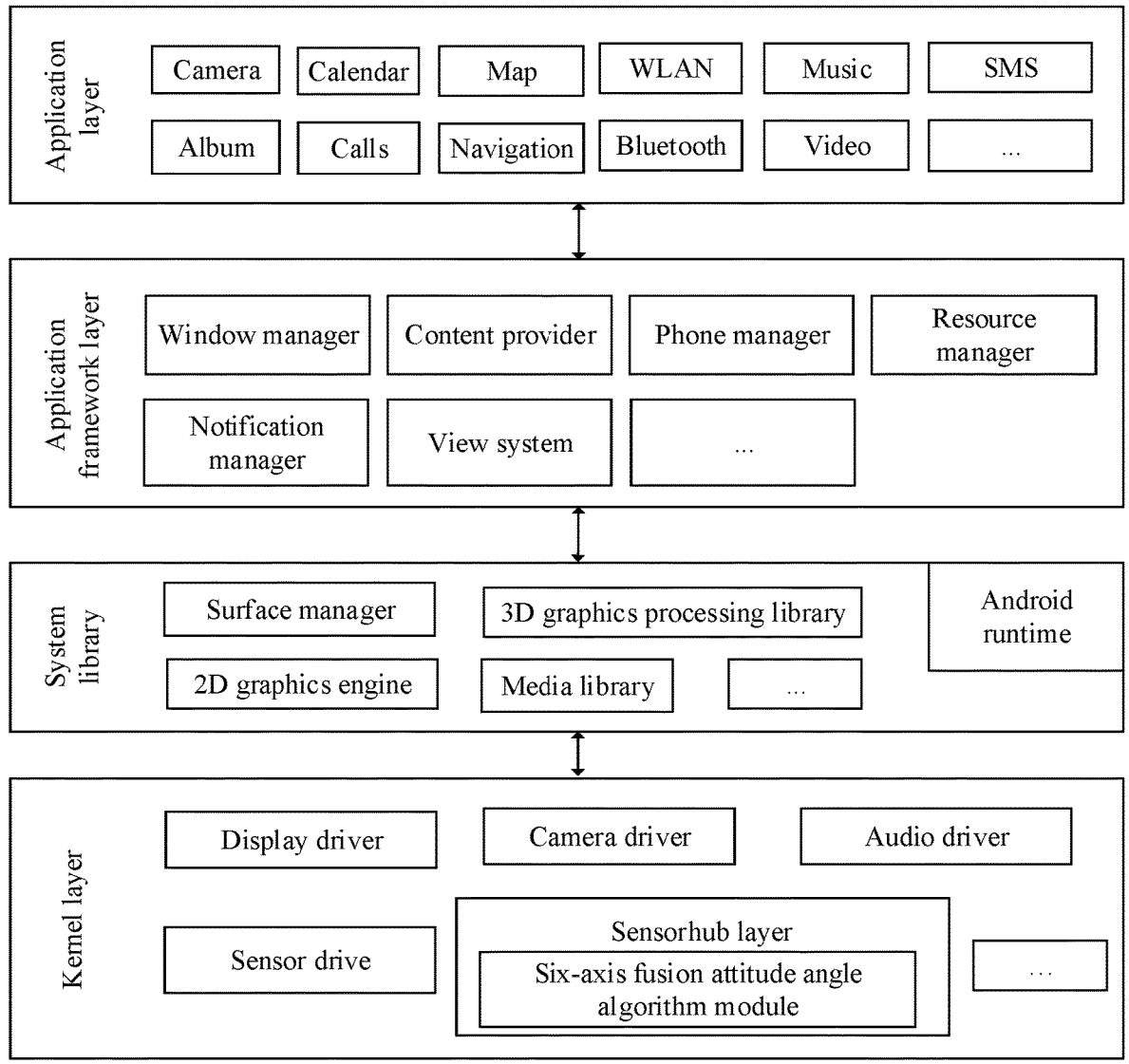
FIG. 3 is a schematic diagram of a software system applicable to an electronic device according to this application.

As shown in FIG. 3, a software system using a layered architecture is divided into several layers, and each layer has a clear role and task. The layers communicate with each other by using a software interface. In some embodiments, the software system may be divided into four layers: an application layer, an application framework layer, an Android runtime (Android Runtime) and system library, and a kernel layer from top to bottom.

The application layer may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer may include some predefined functions.

For example, the application framework layer includes a window manager, a content provider, a view system, a phone manager, a resource manager, and a notification manager.

The window manager is configured to manage a window program. The window manager may obtain a display size, determine whether there is a status bar, perform screen locking, take a screenshot, and the like.

The content provider is configured to store and obtain data, and enable these data to be accessible to an application. The data may include a video, an image, audio, calls that are dialed and answered, a browsing history and a bookmark, and a phone book.

The view system includes visual controls, such as a control for displaying a text and a control for displaying a picture. The view system may be configured to build an application. A display interface may include one or more views, for example, include a display interface of an SMS message notification icon, and may include a view for displaying a text and a view for displaying a picture.

The phone manager is configured to provide a communication function for the electronic device 100, for example, management of a call state (answering or declining).

The resource manager provides various resources for an application, such as a localized string, an icon, a picture, a layout file, and a video file.

The notification manager enables an application to display notification information in the status bar, and may be configured to convey a notification type message, where the displayed notification information may automatically disappear after a short pause without user interaction. For example, the notification manager is configured to provide a notification of download completion and a message notification. The notification manager may also manage a notification that appears in a top status bar of the system in a form of a graph or scroll bar text, for example, a notification of an application running in the background. The notification manager may also manage a notification that appears on the display in a form of a dialog window. For example, text information is prompted in the status bar, a notification sound is produced, the electronic device vibrates, or the indicator light blinks.

The Android runtime includes a core library and a virtual machine. The Android runtime is responsible for scheduling and management of the Android system.

The core library includes two parts: One part is a function that needs to be invoked by a Java language, and the other part is a core library of Android.

The application layer and the application framework layer run on the virtual machine. The virtual machine executes Java files at the application layer and the application framework layer as binary files. The virtual machine is used to implement functions such as object lifecycle management, stack management, thread management, security and exception management, and recycling of waste.

The system library may include a plurality of function modules, for example, a surface manager (surface manager), a media library (Media Libraries), a 3D graphics processing library (for example, open graphics library for embedded systems (open graphics library for embedded systems, OpenGL ES), and a 2D graphics engine (for example, a skia graphics library (skia graphics library, SGL)).

The surface manager is configured to: manage a display subsystem, and provide fusion of 2D layers and 3D layers for a plurality of applications.

The media library supports playback and recording of audio in a plurality of formats, playback and recording of videos in a plurality of formats, and still image files. The media libraries may support a plurality of audio and video encoding formats, such as MPEG 4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG).

The 3D graphics processing library may be configured to implement 3D graphics drawing, image rendering, compositing, and layer processing.

The 2D graphics engine is a drawing engine for 2D drawing.

The kernel layer is a layer between hardware and software. The kernel layer may include drive modules such as a display driver, a camera driver, an audio driver, and a sensor driver.

The following describes an example of a working procedure of a software system and a hardware system of the electronic device 100 with reference to the display of a photographing scenario.

When the user performs a touch operation on the touch sensor 180K, a corresponding hardware interruption is sent to the kernel layer. The kernel layer processes the touch operation into a raw input event, and the raw input event includes information such as touch coordinates and a time stamp of the touch operation. The raw input event is stored at the kernel layer. The application framework layer obtains the raw input event from the kernel layer, identifies a control corresponding to the raw input event, and notifies an application (application, APP) corresponding to the control. For example, the touch operation is a tap operation, and an APP corresponding to the control is a camera APP. After the camera APP is awakened by the tap operation, a camera driver at the kernel layer may be invoked by using the API, and the camera driver controls the camera 193 to photograph.

The kernel layer of the software architecture shown in FIG. 3 may further include a Sensorhub (Sensorhub) layer, which is also referred to as a sensor software driver layer. A six-axis fusion attitude angle algorithm module (which may be referred to as a six-axis fusion module) is disposed in the Sensorhub layer. The six-axis fusion attitude angle algorithm module is configured to fuse three-axis data obtained by the acceleration sensor and three-axis data collected by the gyroscope, to obtain six-axis data, and output a quaternion (quaternion) of the terminal based on the six-axis data. The quaternion may represent an Euler angle (or referred to as an attitude angle) of the terminal. The Euler angle includes a pitch angle (pitch), a roll angle (roll), and a yaw angle (yaw).

A purpose of disposing the six-axis fusion attitude angle algorithm module to the Sensorhub layer is that the Sensorhub layer may run at low power consumption, so that sensor data can be processed in real time without occupying too much power consumption.

Figure 4:
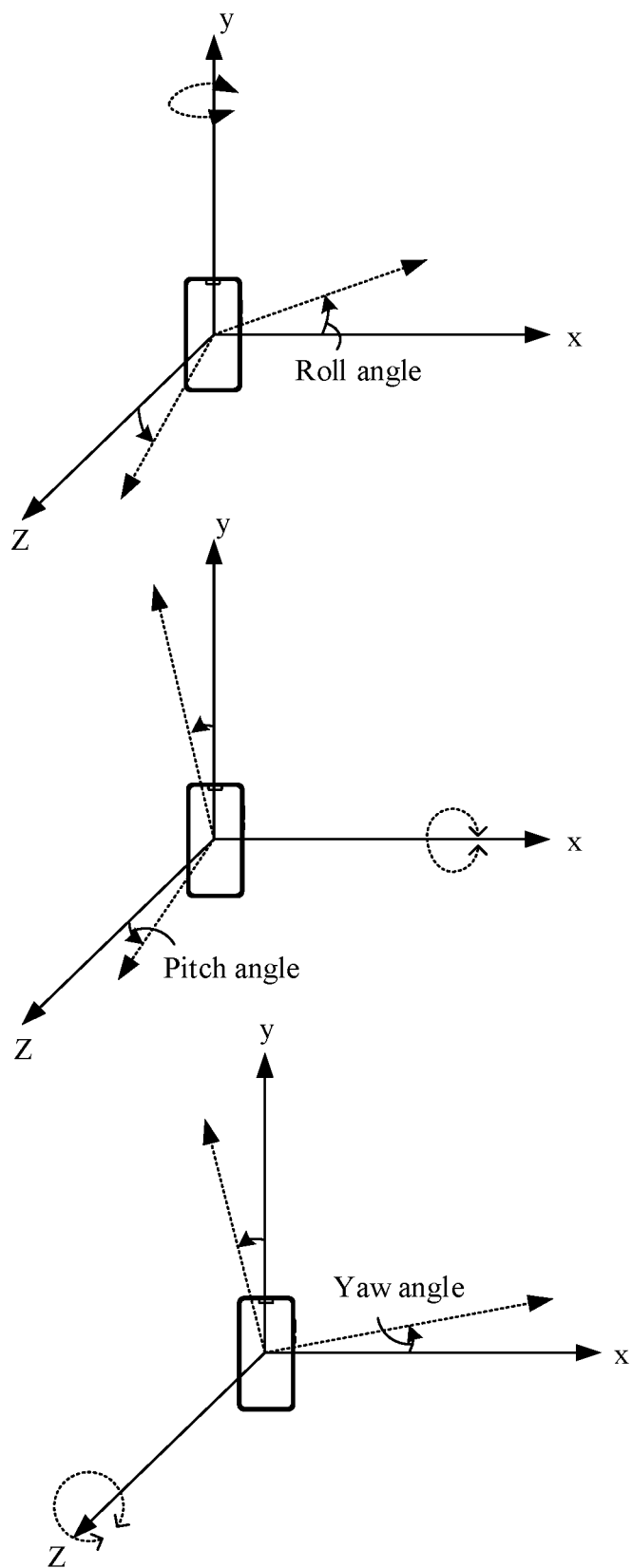
FIG. 4 is a diagram showing an example of a coordinate system defined by a mobile phone.

A coordinate system defined by a mobile phone shown in FIG. 4 is used as an example. It is assumed that a screen of the mobile phone is placed horizontally upward, an x-axis points horizontally to the right, a Y-axis points vertically to the front, and a Z-axis points directly to the front. When the mobile phone swings left and right (rotates around the y-axis), a changed roll angle is obtained. When the mobile phone swings back and forth (rotates around the x-axis), a changed pitch angle is obtained. When the mobile phone is converted from a horizontal screen to a vertical screen or from a vertical screen to horizontal screen (rotates around the z-axis), a changed yaw angle is obtained.

It is assumed that the quaternion is q0, q1, q2, and q3. The attitude angle may be represented by using the following formula:

$$\text{pitch} = \arcsin(q1*q2*2 + 2*q0*q2)*\frac{180}{\pi}$$

$$\text{roll} = \arctan(q1*q2*2 - 2*q0*q3, q0*q0*2 + q1*q1*2 - 1)*\frac{180}{\pi}$$

$$\text{yaw} = \arctan(q2*q3*2 - 2*q0*q1, q0*q0*2 + q3*q3*2 - 1)*\frac{180}{\pi}$$

For example, the quaternion may be calculated by using the following code, and the Euler angle is represented by using the quaternion.

Measurement normalization $$norm = \text{math.sqrt}(ax*ax + ay*ay + az*az)$$

Unitization $$ax = ax/norm$$

$$ay = ay/norm$$

-continued $$az = az/norm$$

Estimated direction gravity $$vx = q1*q3 - q0*q2$$

$$vy = q0*q1 + q2*q3$$

$$vz = q0*q0 - 0.5 + q3*q3$$

Sum of the cross products between the incorrect fields and the direction sensor measurement reference direction $$ex = (ay*vz - az*vy)$$

$$ey = (az*vx - ax*vz)$$

$$ez = (ax*vy - ay*vx)$$

Integral error proportional integral gain $$exInt += ex*Ki*(1/50)$$

$$eyInt += ey*Ki*(1/50)$$

$$ezInt += ez*Ki*(1/50)$$

Adjusted gyroscope measurement $$gx += Kp*ex + exInt$$

$$gy += Kp*ey + eyInt$$

$$gz += Kp*ez + ezInt$$

Integrated quaternion $$gx *= 0.5*(1/50)$$

$$gy *= 0.5*(1/50)$$

$$gz *= 0.5*(1/50)$$

$$q0 += (-q1*gx - q2*gy - q3*gz)$$

$$q1 += (q0*gx + q2*gz - q3*gy)$$

$$q2 += (q0*gy - q1*gz + q3*gx)$$

$$q3 += (q0*gz + q1*gy - q2*gx)$$

Normalized quaternion $$norm = math.sqrt(q0*q0 + q1*q1 + q2*q2 + q3*q3)$$

$$q0/ = norm$$

$$q1/ = norm$$

$$q2/ = norm$$

$$q3/ = norm$$

Obtain Euler angle pitch, roll, yaw pitch = math.asin(−2*q1*q3 + 2*q0*q2)*57.3 roll =
math.atan2(2*q2*q3 + 2*q0*q1, −2*q1*q1 − 2*q2*q2 + 1)*57.3 yaw = math.atan2(2*(q1*q2 + q0*q3),
q0*q0 + q1*q1 − q2*q2 − q3*q3)*57.3 pitch = −math.asin(2*q1*q3 + 2*q0*q2)*57.3 roll = math.atan2(2*q1*q2 − 2*q0*q3, 2*q0*q0 + 2*q1*q1 − 1)*57.3 yaw = math.atan2(2*q2*q3 − 2*q0*q1, 2*q0*q0 + 2*q3*q3 − 1)*57.3

After the attitude angle of the terminal is obtained by using the quaternion, the attitude angle may be used to assist in determining an attitude of the terminal. A specific determining method is described later.

In addition, a gravity component of the terminal may be further calculated by using the quaternion. The gravity component is represented by the following formula:

$$v.x = 2*(q2*q4 - q1*q3);$$

$$v.y = 2*(q1*q2 + q3*q4);$$

$$v.z = 1 - 2*(q2*q2 + q3*q3);$$

After the foregoing gravity components are obtained by using the quaternion, the gravity components may be used to determine whether the terminal is headed down. A specific determining method is described later.

The following describes a method for preventing an accidental touch according to an embodiment of this application with reference to FIG. 5 to FIG. 9.

Figure 5:
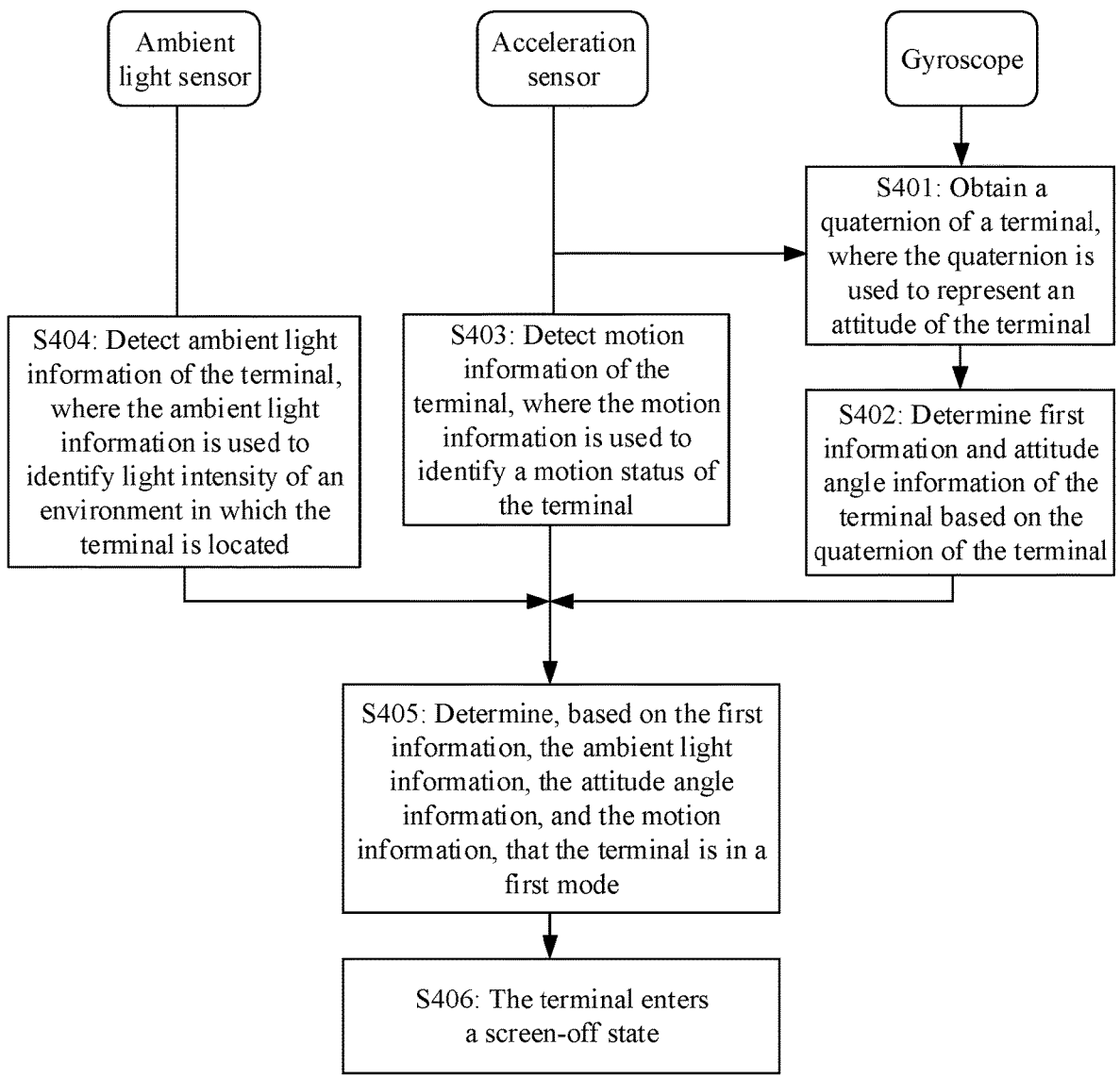
FIG. 5 is a schematic flowchart of a method for preventing an accidental touch according to an embodiment of this application.

Referring to FIG. 5, FIG. 5 shows a schematic flowchart of a method for preventing an accidental touch according to an embodiment of this application. It may be understood that the acceleration sensor, the gyro sensor, and the ambient light sensor in FIG. 5 are merely used as an example for description, and this application is not limited thereto. It may be understood that these sensors may also be replaced with sensors that have same functions. For example, the ambient light sensor may be used to detect ambient light of a terminal, and the ambient light sensor may be replaced with a sensor used to detect ambient light of a terminal. The method may be applied to a scenario shown in FIG. 1. The method includes:

S401: Obtain a quaternion of a terminal by using an acceleration sensor and a gyro sensor, where the quaternion is used to represent an attitude of the terminal.

Specifically, obtaining the quaternion of the terminal is implemented in the following manner: Three-axis data are collected by using the acceleration sensor and the gyroscope separately, six-axis data is obtained, and then the six-axis data is input to the six-axis fusion module mentioned above. The six-axis fusion module outputs the quaternion of the terminal based on the six-axis data.

S402: Determine first information and attitude angle information of the terminal based on the quaternion of the terminal.

The attitude angle information is used to identify an attitude of the terminal. As described above, the attitude angle of the terminal may be calculated by using the quaternion. The pitch angle is mainly used in determining whether the terminal is in a head-down pocket mode. The attitude angle information of the terminal includes the pitch angle of the terminal.

The first information is used to identify whether the terminal is in a head-down state. The head-down state means that a forward direction of the terminal (the forward direction is a direction of a head of the terminal when the user uses the terminal in a vertical screen) is facing downward. In some embodiments, the head-down state may be determined by using whether a head-down angle of the terminal is within a preset range when the forward direction is facing downwards. For example, when the terminal is placed upside down in a pocket, the terminal is in the head-down state.

In addition, as described above, gravity components v.x, v.y and v.z may be further calculated by using the quaternion, where v.y and v.z may be used as a basis for determining that the terminal is headed down. The first information of the terminal includes gravity components v.y and v.z of the terminal.

S403: Detect motion information of the terminal by using an acceleration sensor, where the motion information is used to identify a motion status of the terminal.

The motion status of the terminal includes the following two states: a steady state and a moving state.

The steady state means that the terminal maintains a relatively steady state within a specific period of time. "The terminal maintains a relatively steady state within a specific period of time" does not limit that the terminal does not shake within the period of time. If the terminal slightly shakes at a specific time point, but keeps a steady state overall within the period of time, it is considered that the terminal is in a steady state. For example, the user places the mobile phone in a pocket when walking, and the terminal may shake slightly. In this case, it may be considered that the terminal is in a steady state.

The moving state means that in some scenarios in which when the user uses the terminal, the terminal is shaking or shaking to a certain extent. For example, when the user holds the terminal when walking, the terminal is in a moving state.

The motion information includes an accelerometer combined speed value. The motion status of the terminal can be determined by comparing an accelerometer combined speed value of the terminal with a combined speed threshold. Details are described later.

S404: Detect ambient light information of the terminal by using an ambient light sensor, where the ambient light information is used to identify light intensity (or light brightness) of an environment in which the terminal is located. In other words, the ambient light information is used to identify light intensity of an environment in which the terminal is located. Light intensity may be specifically represented by a light illuminance value. For example, the ambient light information includes light illuminance of the environment in which the terminal is located, and a unit of the ambient light illuminance value may be lux.

For example, in a scenario in which the user holds the terminal in the daytime, the ambient light sensor detects that an illuminance value of an environment in which the terminal is located is relatively large. If the terminal is in a clothing pocket of the user, the ambient light sensor detects that an illuminance value of an environment in which the terminal is located is relatively small.

S405: Determine, based on the ambient light information, the first information, the attitude angle information, and the motion information, that the terminal is in a first mode, where the first mode is used to identify that status information of the terminal meets a corresponding preset condition of the terminal.

The status information of the terminal includes information about the terminal in each dimension (including: ambient light intensity, a motion status of the terminal, a head-down state of the terminal, and a space attitude of the terminal). In this embodiment of this application, that the terminal is in the first mode needs to be determined with reference to information about the terminal in each dimension.

For example, the first mode may be a head-down pocket mode. For a head-down explanation, refer to the foregoing description.

For an explanation of the pocket mode, refer to the following description: Generally, the pocket mode is a general name for a scenario in which a user places a terminal in a weak light environment (even missing light) when a user does not need to use the terminal. For example, when walking, the user may put the terminal in a pants pocket or in a backpack. For another example, the user may place the terminal in a drawer. With reference to the foregoing explanation about the head-down state, for example, a head-down pocket mode may mean that the terminal is placed in a weak light environment and is in a head-down state. It should be understood that the pocket mode is only a name for a scenario of the foregoing type, and the name is not intended to limit the protection scope of this embodiment of this application.

The terminal is in a head-down pocket mode includes the following conditions: the head-down information meets a first preset condition, the attitude angle information meets a second preset condition, the motion information meets a third preset condition, and the ambient light information meets a fourth preset condition.

In this embodiment of this application, whether the terminal is in the head-down pocket mode needs to be jointly determined based on the foregoing four types of information. In a case in which all the foregoing four types of information meet preset conditions, the terminal can be determined as being in a head-down pocket mode.

Optionally, that the head-down information meets the first preset condition includes: (1) A product of two axes of a first gravity component (denoted as v.y) and a second gravity component (denoted as v.z) is a negative number; and (2) An absolute value of v.y is greater than a first threshold, and an absolute value of v.z is less than the first threshold. The first threshold may be a value in the range of 5-10 (including endpoint values). It should be understood that a value of the first threshold is not specifically limited in this application. For example, the first threshold may be 6, 7, or 8. In specific implementation, a head-down flag (headdown_flag) may be introduced to identify whether the terminal is in a head-down state.

Optionally, that the attitude angle information meets the second preset condition includes: A pitch angle of the terminal is within a preset angle range. For example, the preset angle range is 70 degrees to 130 degrees. In specific implementation, a pitch angle flag (pitch_flag) may be introduced to identify whether the pitch angle of the terminal is within a preset angle range.

Optionally, that the motion information meets the third preset condition includes: An accelerometer combined speed value of n consecutive frames is less than or equal to a combined speed threshold. For example, a value of the combined speed threshold may be a value in the range of 900-1300. For example, the combined speed threshold value is 900, 1000, 1050, or 1100.

Optionally, that the motion information meets the third preset condition further includes: A difference between an accelerometer combined speed value of the $i^{th}$ frame and an accelerometer combined speed value of the $(i-1)^{th}$ frame in the n consecutive frames is less than a predetermined difference threshold, where $i \in [2,n]$, and $n \geq 2$. For example, it is assumed that a value of n is 5, and a value of i is 4. For an accelerometer combined speed value of five consecutive frames, a difference between an accelerometer combined speed value of the fourth frame and an accelerometer combined speed value of the third frame is less than a predetermined difference threshold. The predetermined difference threshold may be a value in the range of 100-180 (including endpoint values), which is not limited in this application. For example, the predetermined difference threshold may be 110, 120, 135, 150, or 160. In specific implementation, a steady state flag (steady_flag) may be introduced to identify whether the terminal is in a moving state or a steady state in the pocket mode.

Optionally, that the ambient light information meets the fourth preset condition includes: Ambient light illuminance of the terminal is less than or equal to a first light threshold. For example, the first light threshold may be set to 6.0 lux or 7.0 lux, which is not specifically limited.

It should be understood that the foregoing descriptions about the head-down information meeting the first preset condition, the attitude angle information meeting the second preset condition, the motion information meeting the third preset condition, and the ambient light information meeting the fourth preset condition are exemplary descriptions, and this application is not limited thereto. Actually, a person skilled in the art may set another reasonable determining condition for the head-down pocket mode in which the terminal is in.

S406: The terminal enters a screen-off state. The off-screen state refers to a state in which a screen of the terminal is not on.

In this embodiment of this application, when the terminal receives a signal that triggers screen-on (the signal may be caused by an accidental touch), the ambient light information, the first information, the attitude angle information, and the motion information of the terminal are cooperatively detected by using a plurality of sensors, and whether the terminal is in a head-down pocket mode is determined based on the information. If it is determined that the terminal is in the first mode (or the head-down pocket mode), the terminal enters a screen-off state to reduce power consumption, and in addition, it can be avoided that the terminal is awakened accidentally in always on display and lock screen-on states, thereby effectively preventing an accidental touch.

Figure 6A:
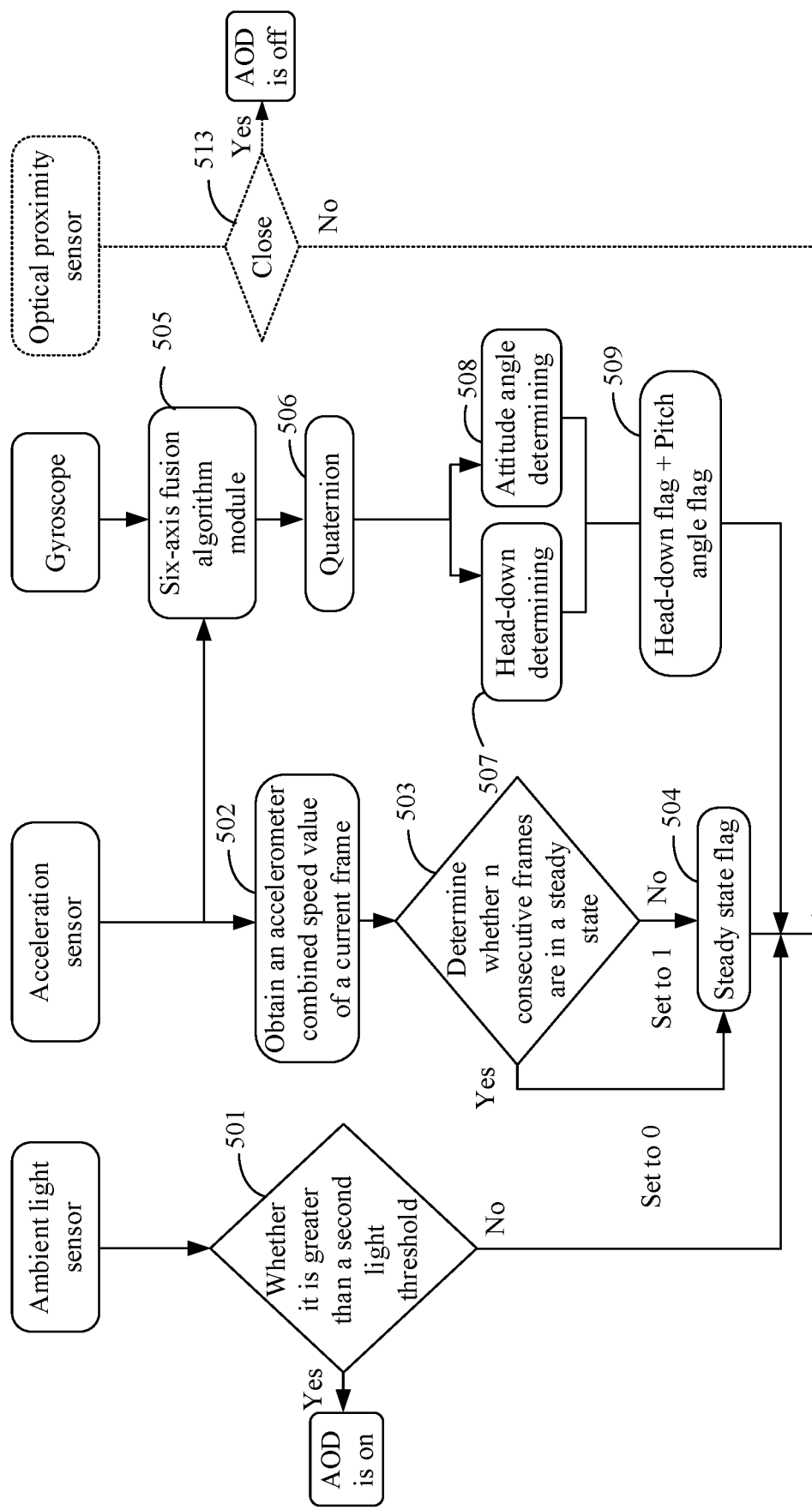
FIG. 6A-FIG. 6B are a specific flowchart of a method for preventing an accidental touch according to an embodiment of this application.
Figure 6B:
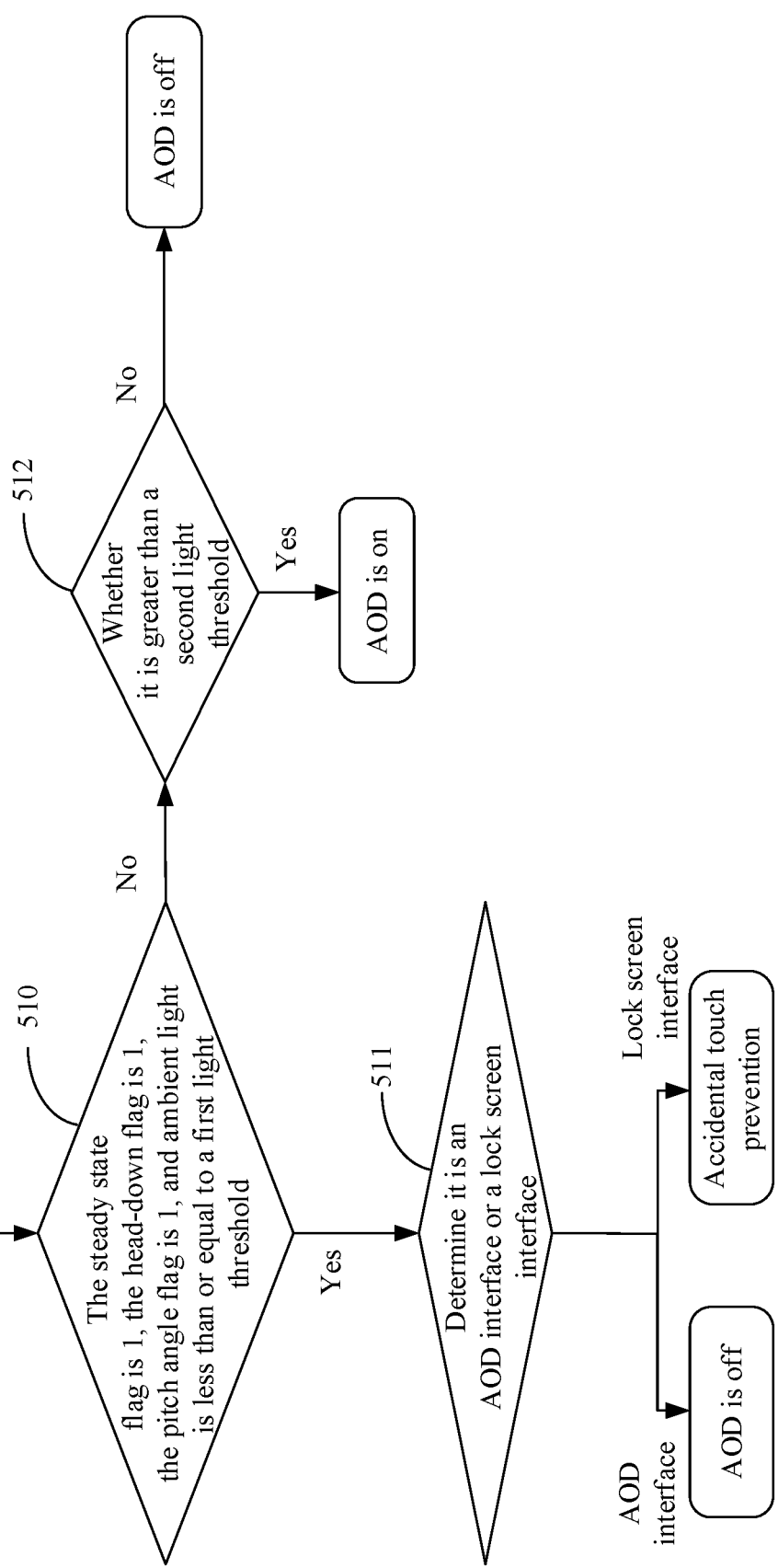

For ease of understanding, the following describes determining logic of the information in detail with reference to the procedure shown in FIG. 6A-FIG. 6B. As shown in FIG. 6A-FIG. 6B, the method includes the following steps.

501: Detect, by using an ambient light sensor, whether ambient light of a terminal is greater than a second light threshold.

If it is detected that the ambient light of the terminal is greater than the second light threshold, the AOD is on. If no, skip to 510 to determine whether the ambient light of the terminal is greater than the first light threshold (that is, the first light threshold mentioned in S406).

502: Obtain an accelerometer combined speed value of a current frame by using an acceleration sensor.

Whether the current frame is in a relatively steady state can be determined based on the accelerometer combined speed value of the current frame.

Based on the accelerometer combined speed value of the current frame, the relative steady state of the current frame may be determined by using the following condition (1): Whether the accelerometer combined speed value of the current frame is greater than the combined speed threshold. If the accelerometer combined speed value of the current frame is not greater than the combined speed threshold, it may be considered that the terminal is in a relatively steady state in the current frame; or if the accelerometer combined speed value of the current frame is greater than the combined speed threshold, it may be considered that the terminal is not in a relatively steady state in the current frame.

The accelerometer combined speed value may be denoted as a, and a is represented by the following formula: $a = x^2 + y^2 + z^2$, where values of x, y, z are collected by using the acceleration sensor. The combined speed threshold may be denoted as A, and a value of the combined speed threshold A may be any value in the range of 900-1300 (including endpoint values). This is not limited in this application.

Optionally, in addition to the foregoing condition (1), the relative steady state may further be determined by using the following condition (2): Whether a difference between the accelerometer combined speed value of the current frame and an accelerometer combined speed value of a previous frame does not exceed the predetermined difference threshold. That is, if the accelerometer combined speed value of the current frame is not greater than the combined speed threshold, and the difference between the accelerometer combined speed value of the current frame and the accelerometer combined speed value of the previous frame does not exceed the predetermined difference threshold, it may be considered that the terminal is in a relatively steady state in the current frame. If the accelerometer combined speed value of the current frame is greater than the combined speed threshold, and the difference between the accelerometer combined speed value of the current frame and the accelerometer combined speed value of the previous frame exceeds the predetermined difference threshold, it may be determined that the terminal is not in a relatively steady state in the current frame.

For the description of the predetermined difference threshold, refer to the foregoing description. For brevity, details are not described herein again.

In addition, a buffer (buffer) may be introduced herein, and data of the current frame is stored in the buffer (buffer), so as to serve as a basis for a subsequent step 503. The data stored in the buffer may include an accelerometer combined speed value of each frame that has been calculated, or a status determining result of each frame, which is not specifically limited herein. A purpose of introducing the buffer herein is to store data of a plurality of consecutive frames for use in the subsequent determining step 503. For example, data of the last five frames are always maintained in the buffer.

The following may determine, by using data of a plurality of consecutive frames, whether the terminal is in a relatively steady state.

503: Determine whether n consecutive frames are in a steady state.

If all the n consecutive frames are in a steady state, it may be determined that the terminal is in a steady state. If the n consecutive frames do not meet a condition that they are all in a steady state, it may be determined that the terminal in a moving state.

It may be understood that, for a status of each frame in the n consecutive frames, reference may be made to the foregoing manner of determining a relatively steady state of the current frame.

For example, if accelerometer combined speed values of the n consecutive frames are all less than the combined speed threshold, and a difference between an accelerometer combined speed value of the $i^{th}$ frame and an accelerometer combined speed value of the $(i-1)^{th}$ frame in the n consecutive frames is less than a predetermined difference threshold, that is, $i \in [2,n]$, it may be determined that the terminal is in a steady state.

It may be understood that the accelerometer combined speed value depends on a motion status of the terminal. For example, a larger moving amplitude of the terminal means a greater value of the accelerometer combined speed value. A moving amplitude of the terminal may be determined by a position of the terminal (for example, in a pocket, in a hand of a user) and a behavior scenario of the user.

Figure 7:
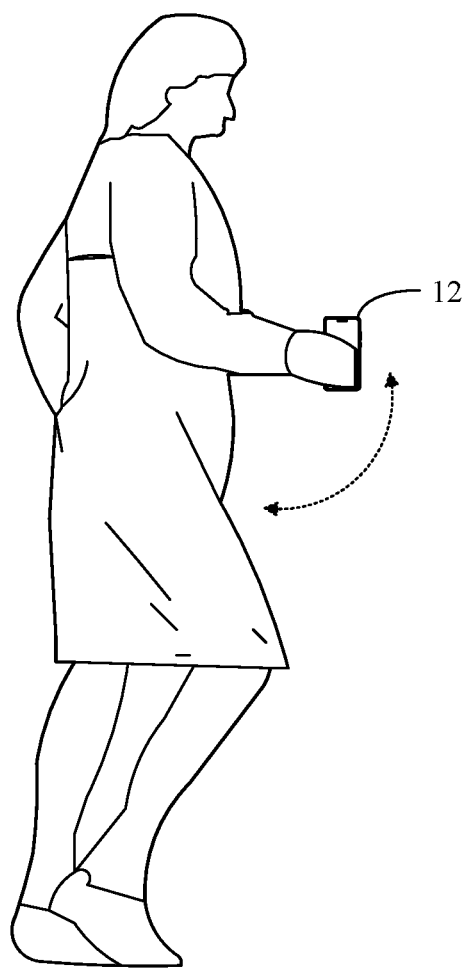
FIG. 7 is an exemplary diagram in which a user holds a terminal.

Taking a user's behavior scenario as walking as an example, when the user is walking, the terminal may have the following two cases: the terminal is in a pants pocket; and the terminal is in the user's hand. A difference between the two states lies in that if the terminal is in the pants pocket, a moving amplitude of the terminal is not too large when the user is walking. If the terminal is in the user's hand, the terminal moves greatly as the arm swings when the user is walking. FIG. 7 shows a scenario in which the user holds the terminal 12 when walking. It can be learned from FIG. 7 that, when the user holds the mobile phone when walking, the terminal 12 also moves with a hand of the user as the arm swings. Compared with the scenario in FIG. 1, an accelerometer combined speed value of the terminal 12 in the scenario in FIG. 7 is greater than an accelerometer combined speed value of the terminal 12 in the scenario in FIG. 1. For example, the accelerometer combined speed value of the terminal 12 in the scenario in FIG. 7 is any value in the range of 900-1300 (including endpoint values). The accelerometer combined speed value of the terminal 12 in the scenario in FIG. 1 is any value in the range of 500-800 (including endpoint values), for example, 550, 600, or 700.

In determining the motion status of the terminal, whether the terminal is in a moving state or a steady state cannot be determined by using data of a frame, but needs to be determined with reference to data of n consecutive frames. In this way, misjudgment of the motion status of the terminal when a large shake occurs in a pocket mode can be avoided, thereby ensuring accuracy of a determining result. For example, when the terminal is in the pocket mode, a relatively large shake may occasionally occurs, and an accelerometer combined speed value calculated for this relatively large shake is greater than the combined speed threshold. However, this relatively large shake is sporadic, which does not necessarily indicate that the terminal is in a moving state.

The foregoing data of n consecutive frames may be obtained from the buffer introduced at 502. For example, an accelerometer combined speed value of n consecutive frames may be obtained from the buffer, and then the combined speed value of each frame is compared with the combined speed threshold. If the accelerometer combined speed values of the n consecutive frames are all greater than the combined speed threshold, the terminal can be determined to be in a moving state. If the accelerometer combined speed values of n consecutive frames are all less than the combined speed threshold, the terminal may be determined to be in a steady state in the pocket. In addition, all cases other than "the combined speed values of n consecutive frames are all greater than the combined speed threshold" are considered as a steady state. In other words, if it is not "all greater than", the terminal is considered to be in a steady state in the pocket.

504: Determine a steady state flag (steady_flag) based on a determining result of 503.

The steady state flag is used to identify whether the terminal is in a steady state or a moving state. For example, when a value of steady_flag is 1, it indicates that the terminal is in a steady state in the pocket. When the value of steady_flag is 0, it indicates that the terminal is in a moving state.

If a determining result of 503 is yes (for example, the accelerometer combined speed values of n consecutive frames are all greater than the combined speed threshold), steady_flag is set to 0. If the determining result of 503 is no, steady_flag is set to 1.

The foregoing 502 to 504 are steps of obtaining the steady state flag.

505: Input three-axis data obtained by using the acceleration sensor and three-axis data obtained by using the gyroscope to a six-axis fusion algorithm module.

506: The six-axis fusion algorithm module outputs a quaternion.

507: Calculate a gravity component based on the quaternion, and perform head-down determining.

508: Calculate an attitude angle based on the quaternion, and perform attitude angle determining.

For a manner of obtaining the quaternion and a specific manner of calculating the attitude angle and the gravity component by using the quaternion, refer to the foregoing description. Details are not described herein again.

Head-down determining is to determine whether a first gravity component of the terminal (denoted as v.y) and a second gravity component (denoted as v.z) meet the following two conditions: (1) A product of two axes v.y and v.z is a negative number; and (2) An absolute value of v.y is greater than a first threshold; and an absolute value of v.z is less than the first threshold.

Attitude angle determining is determining whether the pitch angle is within a preset angle range.

509: Determine a head-down flag (headdown_flag) based on a determining result of step 507, and determine a pitch angle flag (pitch_flag) based on a determining result of step 508.

The head-down flag is used to identify whether the terminal is headed down. For example, when a value of headdown_flag is 1, it indicates that the terminal is headed down. When the value of headdown_flag is 0, it indicates that the terminal is not headed down. Specifically, if the gravity component in 508 meets a preset condition, and the terminal is in a head-down state, headdown_flag is set to 1. If the gravity component in 508 does not meet the preset condition, it is considered that the terminal is not in the head-down state, and headdown_flag is set to 0.

The pitch angle flag is used to identify whether the pitch angle of the terminal is within a preset angle range. For example, when a value of pitch_flag is 1, it indicates that the pitch angle of the terminal is within the preset angle range. When the value of pitch_flag is 0, it indicates that the pitch angle of the terminal is not within the preset angle range. Specifically, if it is determined that the pitch angle is within the preset angle range in step 508, pitch_flag is set to 1; or if it is determined that the pitch angle is not within the preset angle range in step 508, pitch_flag is set to 0.

The foregoing 505 to 509 are steps of obtaining the head-down flag and the pitch angle flag.

It should be understood that the foregoing steps 501, 502 to 504, and 505 to 509 may be understood as three branches executed by the algorithm. In specific implementation, the three branches may be simultaneously executed, and a sequence of step numbers does not represent an execution sequence of the three branches.

510: Determine whether the steady flag is 1, the head-down flag is 1, the pitch angle flag is 1, and the ambient light is less than or equal to a first light threshold.

The first light threshold is less than the second light threshold.

If the steady state flag is 1, the head-down flag is 1, the pitch angle flag is 1, and the ambient light is less than or equal to the first light threshold, it indicates that the terminal is in the head-down pocket mode, and 511 is performed.

In addition, if the ambient light is greater than the first light threshold, the environment light in which the terminal is located is continuously detected, and 512 is performed.

511: Determine whether an interface is an AOD interface or a lock screen interface (or an unlock interface).

If the interface is the AOD interface, the AOD is off. If the interface is the lock screen interface, an accidental touch prevention mode is entered.

Figure 8:
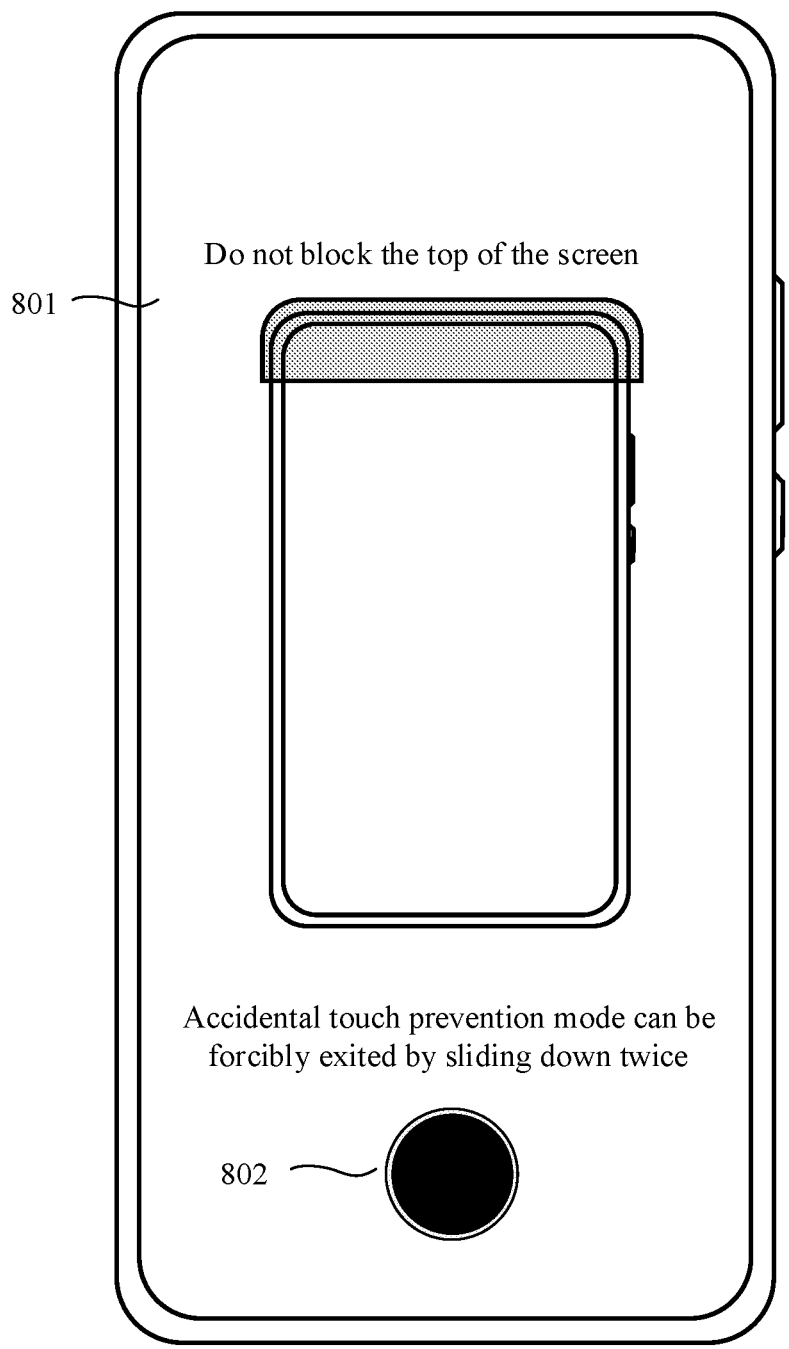
FIG. 8 is a diagram showing an example of interface display of an accidental touch prevention mode.

FIG. 8 is a diagram showing interface display for an accidental touch prevention mode. As shown in FIG. 8, on the interface 801, the user is prompted with words "Do not block the top of the screen" and a corresponding schematic diagram. In the accidental touch prevention interface, words "Accidental touch prevention mode can be forcibly exited by sliding down twice" is further presented, that is, the user may exit the accidental touch prevention mode by sliding down twice on a control 802. It may be understood that if the terminal is in the head-down pocket mode currently, the user does not perform an operation of sliding down the control 802, and the terminal is automatically turned off.

In addition, on the lock screen interface, a premise of entering the accidental touch prevention mode is that the accidental touch prevention mode of the terminal is enabled, or an accidental touch prevention mode function is solidified in the terminal (that is, the user does not need to enable the accidental touch prevention mode).

Figure 9:
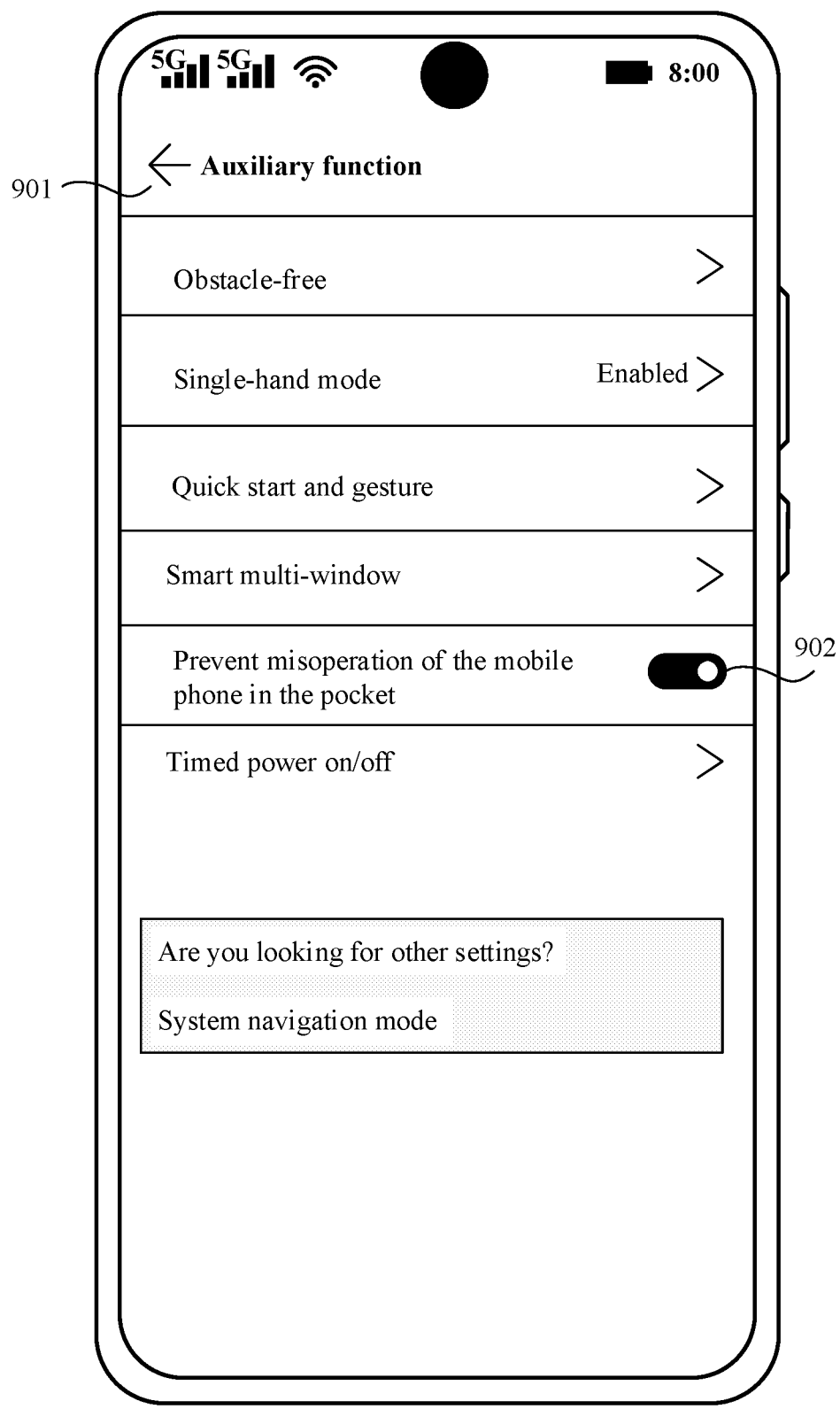
FIG. 9 is a diagram showing an example of an interface for enabling an accidental touch prevention mode.

FIG. 9 shows an interface for enabling an accidental touch prevention mode. As shown on the interface in FIG. 9, an auxiliary function control 901 includes an option 902 for the accidental touch prevention mode. By clicking the option 902, the user may select to enable or disable the accidental touch prevention mode. On the interface shown in FIG. 9, the option 902 for enabling the accidental touch prevention mode is displayed. After the user enables the function, if an accidental touch occurs on the lock screen interface, the mobile phone can enter the accidental touch prevention mode to enter the interface shown in FIG. 8. It may be understood that the auxiliary function control 901 further includes options of other function controls, for example, an obstacle-free mode, a single-hand mode, a quick start and gesture, a smart multi-window, and timed power on/off shown in FIG. 9. This is not specifically limited herein.

512: Determine whether the ambient light is greater than the second light threshold. If yes, AOD is on; or if no, AOD is off.

In this embodiment of this application, regardless of whether an optical proximity sensor is disposed in the terminal, the foregoing method for preventing an accidental touch is applicable.

In a possible implementation, an optical proximity sensor is disposed in the terminal. Correspondingly, the method in FIG. 6A-FIG. 6B further includes:

513: Determine, by using an optical proximity sensor, whether it is close. If it is close, AOD is off. If it is determined that it is not close, skip to 510.

In some scenarios (for example, the terminal is placed in a pocket of a black clothing), the optical proximity sensor is not very sensitive, resulting in an inaccurate determining result. Based on this, when the proximity light sensor determines that it is not close, the proximity light sensor may further determine with reference to the foregoing condition in 510, so as to determine whether the terminal is in the head-down pocket mode.

It may be understood that the examples in FIG. 6A-FIG. 6B to FIG. 9 are merely convenient for a person skilled in the art to understand, and are not intended to limit the protection scope of the embodiments of this application.

It may be learned from the foregoing that, according to the method for preventing an accidental touch provided in this application, the ambient light information, the head-down information, the attitude angle information, and the motion information of the terminal are cooperatively detected by using a plurality of sensors, and it is determined, based on the information, whether the terminal is in a head-down pocket mode, which can effectively resolve a problem of preventing an accidental touch in a pocket mode, thereby greatly improving user experience.

This application further provides a computer program product. When the computer program product is executed by the processor, the method according to any method embodiment in this application is implemented.

The computer program product may be stored in a memory, and the computer program product is finally converted into an executable target file that can be executed by the processor through a processing process such as preprocessing, compiling, assembling, and linking.

This application further provides a computer-readable storage medium, and a computer program is stored on the computer-readable storage medium. When the computer program is executed by a computer, the method in any one of the method embodiments of this application is implemented. The computer program may be a high-level language program, or may be an executable target program.

The computer-readable storage medium may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and the random access memory is used as an external cache. For example but not for limitation, many forms of RAMs are available, such as a static RAM (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DR RAM).

It may be clearly understood by a person skilled in the art that, for convenience and brevity of description, for a detailed working process and a technical effect of the foregoing described apparatus and device, reference may be made to a corresponding process and technical effect in the foregoing method embodiments, and details are not described herein again.

In the several embodiments provided in this application, the disclosed system, apparatus, and method may be implemented in another manner. For example, some features of the method embodiments described above may be ignored or not performed. The described apparatus embodiment is merely an example, and unit division is merely logical function division and may be another division in actual implementation. A plurality of units or components may be combined or integrated into another system. In addition, couplings between units or couplings between components may be direct couplings, or may be indirect couplings. The couplings includes connections in electronic, mechanical, or another form.

It should be understood that, in various embodiments of this application, sequence numbers of the foregoing processes do not mean execution sequences. The execution sequences of the processes should be determined based on functions and internal logic of the processes, and should not be construed as any limitation on the implementation processes of the embodiments of this application.

In addition, the terms "system" and "network" in this specification are often used interchangeably in this specification. In this specification, the term "and/or" is only used to describe an association relationship between associated objects, and indicates that three relationships may exist. For example, A and/or B may indicate the following: Only A exists, both A and B exist, and only B exists. In addition, the character "/" in this specification usually indicates an "or" relationship between the associated objects.

In conclusion, the foregoing descriptions are merely preferred embodiments of the technical solutions of this application, and are not intended to limit the protection scope of this application. Any modifications, equivalents, modifications, or the like made within the spirit and principles of this application shall fall within the protection scope of this application.

What is claimed is:

1. A method for preventing an accidental touch, comprising:
   obtaining a quaternion of a terminal by using an acceleration sensor and a gyro sensor, wherein the quaternion is used to represent an attitude of the terminal;
   determining first information and attitude angle information of the terminal based on the quaternion of the terminal, wherein the first information is used to identify whether the terminal is in a head-down state, and the attitude angle information is used to identify an attitude of the terminal;
   detecting motion information of the terminal by using the acceleration sensor, wherein the motion information is used to identify a motion status of the terminal;
   detecting ambient light information of the terminal by using an ambient light sensor, wherein the ambient light information is used to identify light intensity of an environment in which the terminal is located;
   determining, based on the first information, the attitude angle information, the motion information, and the ambient light information, that the terminal is in a first mode, wherein the first mode is used to identify that status information of the terminal meets a corresponding preset condition of the terminal; and
   entering, by the terminal, a screen-off state.

2. The method according to claim 1, wherein the determining, based on the first information, that the terminal is in a first mode comprises: the first information meets a first preset condition; and
   that the first information meets a first preset condition comprises:
   a product of a first gravity component and a second gravity component of the terminal is a negative number; and
   an absolute value of the first gravity component is greater than a first threshold, and an absolute value of the second gravity component is less than the first threshold;
   wherein the first gravity component and the second gravity component are obtained through calculation based on the quaternion.

3. The method according to claim 1, wherein the determining, based on the attitude angle information, that the terminal is in a first mode comprises: the attitude angle information meets a second preset condition; and
   that the attitude angle information meets a second preset condition comprises:
   a pitch angle of the terminal is within a preset angle range; wherein
   the pitch angle of the terminal is obtained through calculation based on the quaternion.

4. The method according to claim 1, wherein the determining, based on the motion information, that the terminal is in a first mode comprises: the motion information meets a third preset condition; and
   that the motion information meets a third preset condition comprises:
   an accelerometer combined speed value for n consecutive frames is less than or equal to a combined speed threshold, wherein n≥2, wherein n is an integer.

5. The method according to claim 4, wherein the motion information meets a third preset condition further comprises:
   a difference between an accelerometer combined speed value of the $i^{th}$ frame and an accelerometer combined speed value of the $(i-1)^{th}$ frame in the n consecutive frames is less than a predetermined difference threshold, wherein $i \in [2,n]$.

6. The method according to claim 1, wherein the determining, based on the ambient light information, that the terminal is in a first mode comprises: the ambient light information meets a fourth preset condition; and
   that the ambient light information meets a fourth preset condition comprises:
   ambient light illuminance of the terminal is less than or equal to a first light threshold.

7. The method according to claim 6, wherein when the ambient light illuminance of the terminal is greater than the first light threshold, the method further comprises:
   detecting, by using the ambient light sensor, whether ambient light of the terminal is greater than a second light threshold, wherein the second light threshold is greater than the first light threshold; and
   when the ambient light illuminance of the terminal is greater than the second light threshold, a screen of the terminal is on; and
   when the ambient light illuminance of the terminal is less than or equal to the second light threshold, the terminal enters a screen-off state.

8. The method according to claim 1, wherein before the determining, based on the first information, the attitude angle information, the motion information, and the ambient light information, that the terminal is in a first mode, the method further comprises:
   detecting reflected light information of the terminal by using an optical proximity sensor; and
   the determining, based on the first information, the attitude angle information, the motion information, and the ambient light information, that the terminal is in a first mode comprises:
   when no reflected light is detected, determining, based on the first information, the attitude angle information, the motion information, and the ambient light information, that the terminal is in the first mode.

9. The method according to claim 1, wherein before the terminal enters a screen-off state, the method further comprises:
   detecting an interface of the terminal; and
   that the terminal enters a screen-off state comprises:
   if the interface of the terminal is an always on display AOD interface, AOD is turned off; and
   if the interface of the terminal is a lock screen interface, the terminal enters an accidental touch prevention mode.

10. An electronic device, comprising a processor and a memory, wherein the processor is coupled to the memory, the memory is configured to store a computer program, and when the computer program is executed by the processor, the electronic device is enabled to perform the following steps:
  obtaining a quaternion of a terminal by using an acceleration sensor and a gyro sensor, wherein the quaternion is used to represent an attitude of the terminal;
  determining first information and attitude angle information of the terminal based on the quaternion of the terminal, wherein the first information is used to identify whether the terminal is in a head-down state, and the attitude angle information is used to identify an attitude of the terminal;
  detecting motion information of the terminal by using the acceleration sensor, wherein the motion information is used to identify a motion status of the terminal;
  detecting ambient light information of the terminal by using an ambient light sensor, wherein the ambient light information is used to identify light intensity of an environment in which the terminal is located;
  determining, based on the first information, the attitude angle information, the motion information, and the ambient light information, that the terminal is in a first mode, wherein the first mode is used to identify that status information of the terminal meets a corresponding preset condition of the terminal; and
  entering, by the terminal, a screen-off state.

11. The electronic device according to claim 10, wherein the determining, based on the first information, that the terminal is in a first mode comprises: the first information meets a first preset condition; and
  that the first information meets a first preset condition comprises:
  a product of a first gravity component and a second gravity component of the terminal is a negative number; and
  an absolute value of the first gravity component is greater than a first threshold, and an absolute value of the second gravity component is less than the first threshold; wherein
  the first gravity component and the second gravity component are obtained through calculation based on the quaternion.

12. The electronic device according to claim 10, wherein the determining, based on the attitude angle information, that the terminal is in a first mode comprises: the attitude angle information meets a second preset condition; and
  that the attitude angle information meets a second preset condition comprises:
  a pitch angle of the terminal is within a preset angle range; wherein
  the pitch angle of the terminal is obtained through calculation based on the quaternion.

13. The electronic device according to claim 10, wherein the determining, based on the motion information, that the terminal is in a first mode comprises: the motion information meets a third preset condition; and
  that the motion information meets a third preset condition comprises:
  an accelerometer combined speed value for n consecutive frames is less than or equal to a combined speed threshold, wherein n≥2, and n is an integer.

14. The electronic device according to claim 13, wherein the motion information meets a third preset condition further comprises:
  a difference between an accelerometer combined speed value of the $i^{th}$ frame and an accelerometer combined speed value of the $(i-1)^{th}$ frame in the n consecutive frames is less than a predetermined difference threshold, wherein i∈[2,n].

15. The electronic device according to claim 10, wherein the determining, based on the ambient light information, that the terminal is in a first mode comprises: the ambient light information meets a fourth preset condition; and
  that the ambient light information meets a fourth preset condition comprises:
  ambient light illuminance of the terminal is less than or equal to a first light threshold.

16. The electronic device according to claim 15, wherein when the ambient light illuminance of the terminal is greater than the first light threshold, the method further comprises:
  detecting, by using the ambient light sensor, whether ambient light of the terminal is greater than a second light threshold, wherein the second light threshold is greater than the first light threshold; and
  when the ambient light illuminance of the terminal is greater than the second light threshold, a screen of the terminal is on; and
  when the ambient light illuminance of the terminal is less than or equal to the second light threshold, the terminal enters a screen-off state.

17. The electronic device according to claim 10, wherein before the determining, based on the first information, the attitude angle information, the motion information, and the ambient light information, that the terminal is in a first mode, the method further comprises:
  detecting reflected light information of the terminal by using an optical proximity sensor; and
  the determining, based on the first information, the attitude angle information, the motion information, and the ambient light information, that the terminal is in a first mode comprises:
  when no reflected light is detected, determining, based on the first information, the attitude angle information, the motion information, and the ambient light information, that the terminal is in the first mode.

18. The electronic device according to claim 10, wherein before the terminal enters a screen-off state, the method further comprises:
  detecting an interface of the terminal; and
  that the terminal enters a screen-off state comprises:
  if the interface of the terminal is an always on display AOD interface, AOD is turned off; and
  if the interface of the terminal is a lock screen interface, the terminal enters an accidental touch prevention mode.

19. A non-transitory computer-readable storage medium, wherein the computer-readable storage medium stores a computer program, and when the computer program is executed by a processor, the processor is enabled to perform the following steps:
  obtaining a quaternion of a terminal by using an acceleration sensor and a gyro sensor, wherein the quaternion is used to represent an attitude of the terminal;
  determining first information and attitude angle information of the terminal based on the quaternion of the terminal, wherein the first information is used to identify whether the terminal is in a head-down state, and the attitude angle information is used to identify an attitude of the terminal;

detecting motion information of the terminal by using the acceleration sensor, wherein the motion information is used to identify a motion status of the terminal;

detecting ambient light information of the terminal by using an ambient light sensor, wherein the ambient light information is used to identify light intensity of an environment in which the terminal is located;

determining, based on the first information, the attitude angle information, the motion information, and the ambient light information, that the terminal is in a first mode, wherein the first mode is used to identify that status information of the terminal meets a corresponding preset condition of the terminal; and entering, by the terminal, a screen-off state.

* * * * *